UNITED STATES PATENT OFFICE.

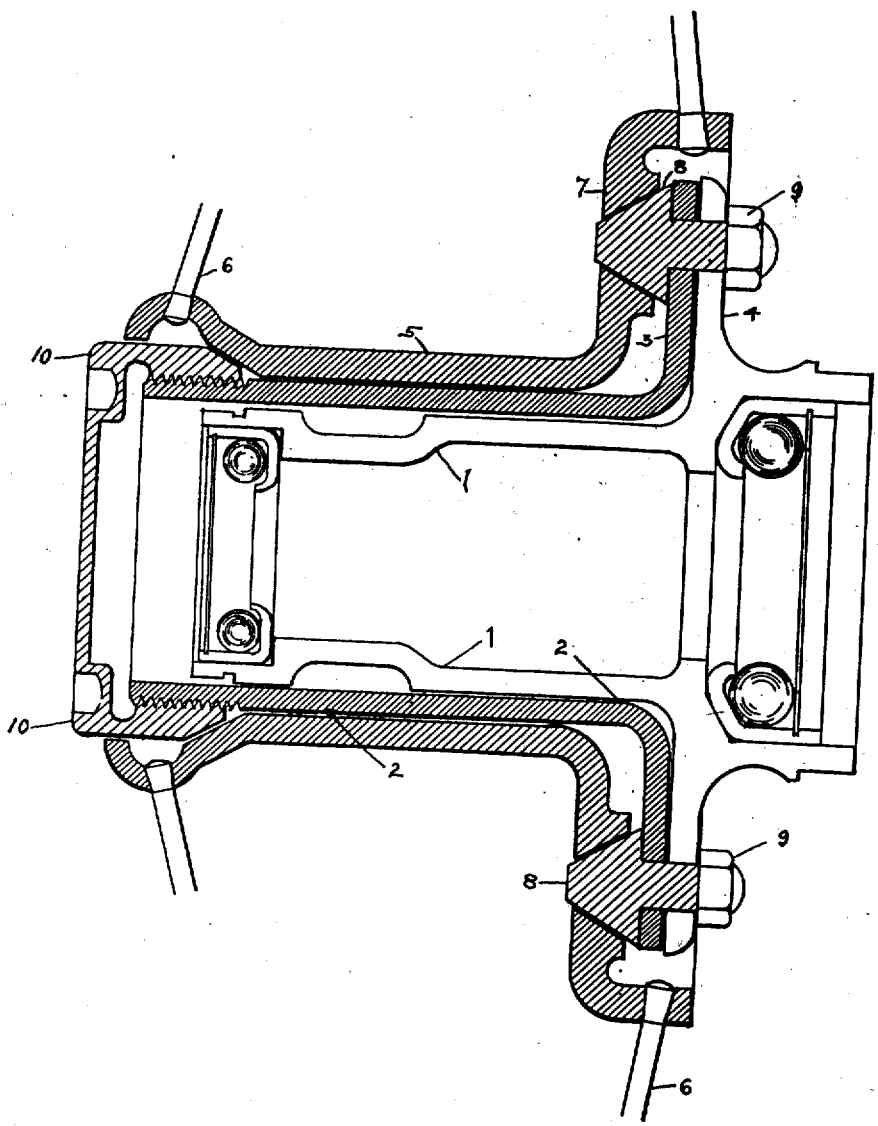

WILFRED L. REGNIER, OF DAYTON, OHIO.

DETACHABLE WHEEL.

1,337,271.  Specification of Letters Patent.  Patented Apr. 20, 1920.

Application filed January 10, 1919. Serial No. 270,482.

*To all whom it may concern:*

Be it known that I, WILFRED L. REGNIER, a citizen of the United States, residing at Dayton, in the county of Montgomery and State of Ohio, have invented certain new and useful Improvements in Detachable Wheels, of which the following is a specification.

This invention relates to new and useful improvements in detachable wheels.

The principal object of the invention is to provide a demountable wheel, preferably of the wire type, that may be readily applied to the hub of a wood wheel, without changing or removing that hub after the wooden part has been taken off. My invention is well adapted for Ford automobiles, by making it possible to easily apply to the hubs of the wood wheels thereof, a demountable wire wheel without altering or removing the hub after the wooden part has been disconnected therefrom.

Another object of my invention is to provide tapered means for forming the driving connection between the inner hub of the demountable wheel and the wood wheel hub, whereby any wear in the driving connection may be readily taken up.

The preferred form of embodiment of my invention is illustrated in the accompanying drawing, throughout which and the specification similar reference characters denote corresponding parts.

Referring to the accompanying drawing, which is a view, partly in section, of a demountable wire wheel hub applied to the wood hub of an automobile, the numeral 1 designates the last named hub, while the numeral 2 designates the sleeve or inner hub of a wire wheel. The sleeve 2, which is exteriorly threaded on its outer end, is adapted to telescope on the hub 1, terminating at its inner end in a flange portion 3 adapted to be secured to the flange 4 of the said hub 1.

The numeral 5 designates the outer portion of the removable wire wheel hub that supports the wheel structure by means of spokes 6. This outer hub portion 5 is adapted to be readily slipped over the sleeve 2 after the latter is in place upon the hub 1. The outer hub portion 5 terminates at its inner end in a flanged part 7 provided with tapered apertures or holes adapted to receive the tapered heads of driving pins 8 whose shank portions project through holes in the sleeve flanged portion 3 and hub flanged portion 4 respectively. Each driving pin 8 is threaded on its inner end to receive a nut 9. The heads of the drive pins 8 are tapered whereby their position in the tapered holes of the flange 7 of the outer hub portion 5 of the wire wheel, may be adjusted to take up wear or play.

The outer hub portion 5 of the wire wheel is firmly held in place on the sleeve 2, and is pressed firmly against the tapered heads of the drive pins 8, by means of a hub cap 10 adapted to be screwed on or off the threaded end of said sleeve by a spanner wrench. The hub cap 10 has an inwardly tapering inner end which, when the said cap is screwed inwardly, will engage the interior periphery of the outwardly flaring outer end of the hub portion 5 of the demountable wheel, to hold it on the sleeve 2 as well as to press it tightly against the tapered heads of the driving pins 8. The hub cap 10 is preferably made of brass, while the sleeve 2 and outer hub portion 5 are preferably constructed of pressed steel.

To apply my improved demountable wheel hub to the hub of a wood wheel, it is only necessary to remove the wood portion from the latter, leaving the hub stand as it is. The sleeve 2 is then slipped over the hub 1, after which the shank portions of the drive pins 8 are passed through the holes in the flanged portions 3 and 4 of the sleeve 2 and hub 1 respectively, and the nuts 9 applied to, and tightened on, the inner ends of said pins. The outer hub portion 5 of the wire wheel is then forced over the sleeve 2 until the tapered holes in the flanged portion 7 of the former tightly receive the tapered heads of the driving pins 8. The hub cap 10 is then screwed on the threaded end of the sleeve 2 a sufficient distance to hold the hub portion 5 firmly on the sleeve 2, and the flanged portion 7 of the latter tightly against the tapered heads of said driving pins 8. A demountable wire wheel is therefore provided for ready and firm attachment to the hub of a wood wheel, without altering or changing the latter hub after the wood part has been removed.

To change a tire, or for any other reason, my improved demountable wire wheel may be removed from the sleeve 2 as readily as it is put on.

Having described my invention, I claim:

In a device of the type specified, the combination with a wood wheel hub, of a sleeve adapted to be telescoped thereon, a flange on the inner end of said sleeve, a corresponding flange on the wood wheel hub, an outer hub adapted to be slipped on said sleeve, a flange on said outer hub adjacent the flange on said sleeve, pins connecting the flange on said wood wheel hub and the flange on said sleeve, a nut on each pin adapted to bear against the flange on the wood wheel hub, and an arrow-shaped head on the outer end of each pin whose base portion bears against the flange on said sleeve and whose tapering front portion projects into a tapering hole in the flange of the outer hub.

In testimony whereof I have hereunto set my hand this 8th day of January, 1919.

WILFRED L. REGNIER.

Witness:
HOWARD S. SMITH.